United States Patent [19]

Davis

[11] Patent Number: 4,890,874
[45] Date of Patent: Jan. 2, 1990

[54] LINER FOR A PICKUP TRUCK BED

[76] Inventor: Cecil Davis, P.O. Box 113, Mayfield, Ky. 42066

[21] Appl. No.: 293,921

[22] Filed: Jan. 3, 1989

[51] Int. Cl.$^4$ .................................................. B62D 33/02
[52] U.S. Cl. .................................. 296/39.2; 224/42.42
[58] Field of Search .................. 296/39.1, 39.2, 24.1; 105/423; 224/42.42

[56] References Cited

U.S. PATENT DOCUMENTS

| | | |
|---|---|---|
| 818,257 | 4/1906 | Kennedy . |
| 1,527,080 | 2/1925 | Ringel ................................. 105/423 |
| 1,916,344 | 7/1933 | Thoms et al. ....................... 105/423 |
| 2,574,483 | 11/1951 | Jack ................................ 296/24.1 X |
| 2,710,134 | 6/1955 | Schroeder et al. ................. 105/423 |
| 2,911,253 | 11/1959 | Dewey ................................ 296/39.1 |
| 3,142,265 | 7/1964 | Ford .................................... 105/423 |
| 4,186,845 | 2/1980 | Podd ............................... 296/39.1 X |
| 4,279,439 | 7/1981 | Cantieri ............................. 296/39.2 |
| 4,396,219 | 8/1983 | Cline . |
| 4,461,402 | 7/1984 | Fell et al. ........................ 105/423 X |
| 4,505,508 | 3/1985 | Carter et al. ..................... 105/423 X |
| 4,540,214 | 9/1985 | Wagner .......................... 105/423 X |

FOREIGN PATENT DOCUMENTS 1260708  4/1961  France ................................ 296/39.2

Primary Examiner—Dennis H. Pedder
Assistant Examiner—Gary C. Hoge
Attorney, Agent, or Firm—Jones, Askew & Lunsford

[57] ABSTRACT

A foldable liner of fiberboard having a cruxiform shape having a bottom sheet, side flaps, a front flap, and a tailgate flap, each flap foldable along score lines perpendicular to the sheet to conform the liner to the shape of a pickup truck bed, a pair of wheel well knockouts defined in the bottom sheet and the side flaps to form rectangular popout wheel well covers upon folding the side flaps, the adjacent edges of the folded flaps defining corners which may be joined together rigidly, with at least one fold line whereby the liner may be folded to a smaller size for handling and storage.

23 Claims, 2 Drawing Sheets

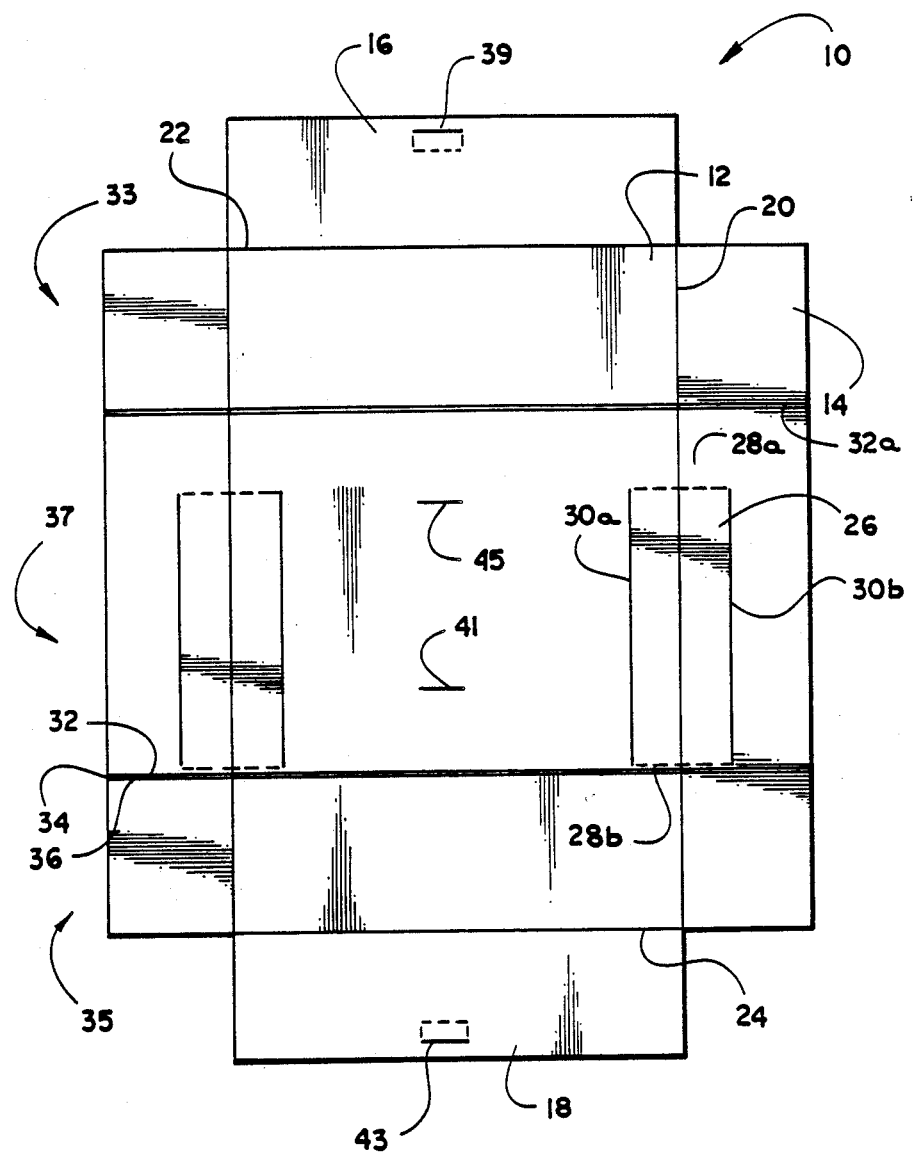
Fig_1

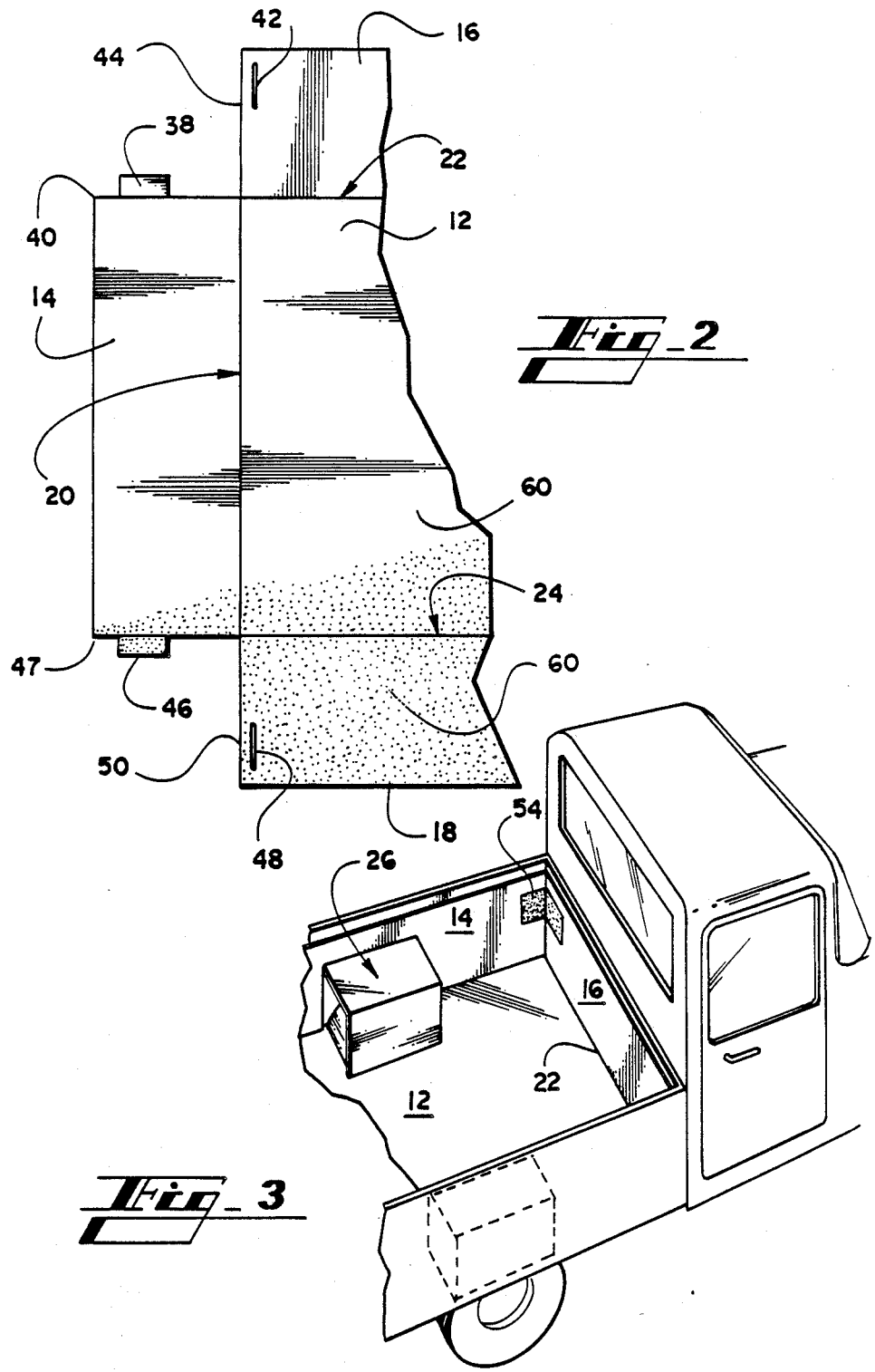

LINER FOR A PICKUP TRUCK BED

TECHNICAL FIELD

The present invention relates to a protective liner for a pickup truck bed. More particularly, the present invention provides a disposable, inexpensive liner for protecting the bed of a pickup truck from damage caused by cargo, including a wheel well cover which pops out from the sheet when a side flap folds upward along its score line with the liner.

BACKGROUND OF THE INVENTION

Pickup trucks are used to transport a variety of cargo carried in the bed of the pickup truck. Generally, cargo may be in a container such as a box or crate or the cargo may be loose materials such as wood, rocks, gravel, or tools, for example. Such cargo, when loaded, transported, or removed from the truck may scratch, dent, or otherwise damage the bed, the walls and the painted finish of the pickup truck. For pickup trucks which are primarily used for cargo hauling, such wear and tear damage may be accepted as a minor consequence for using the vehicle for its intended purposes. Recently however, pickup trucks have become more popular as general purpose transportation vehicles. These owners (as well as some using the trucks for routine cargo handling duties) have sought to avoid scratching, denting, or otherwise damaging the pickup truck bed and its painted finish.

To reduce or eliminate such damage caused by transporting cargo, pickup truck owners have used a liner to protect the bed and walls from dents and nicks and to avoid scratching or scarring the finish. U.S. Pat. No. 4,279,439 describes a molded flexible rubber sheet for lining and protecting pickup truck beds. Grooves in the underside of the liner permit side flaps, a front flap, and a rear flap, to fold vertically against the walls of the truck bed and the tailgate. Molded markings indicate where the liner should be cut to accomodate wheel wells.

U.S. Pat. No. 4,505,508 describes a plywood kit for lining the inside of a pickup truck bed. The kit includes side panel liner sheets, a pair of wheel well liner boxes, a floor liner, a front liner, and a tailgate liner. The sheets are secured together by conventional screws, bolts or other connecting devices with a minimum of holes formed on the truck body itself.

U.S. Pat. No. 4,396,219 describes a liner kit having panels made of shock absorbant material molded to conform to the sidewall cavity, to the front panel, and the floor of the vehicle bed. Metal plates are secured to the surface of the shock absorbant material. The assembled panels are then installed and connected together within the vehicle carrier bed by suitable adhesives.

U.S. Pat. No. 2,911,253 describes an automobile trunk liner made of fabric in a cruciform shape when spread out flat. The liner attaches to the trunk with clamp hooks which are riveted to the free edges of the side and front flaps.

Such previously known liners resist cargo damage to pickup truck beds, but various drawbacks and problems with these liners restrict their use. For instance, a pickup truck owner using the truck occasionally for carrying cargo may not want the truck bed covered with a permanent liner. A removable liner however may be an expensive investment and must be stored between uses. Storing the liner in the truck, such as behind the seat, maximizes the convenient availability of the liner. Plastic liners as described in U.S. Pat. No. 4,279,439 are difficult to fold and require rolling. These heavy liners when rolled, occupy a large volume of space for storage. It is not convenient or practical to store a rolled liner behind the seat of the truck. Also, the liner when installed, must be cut to fit around the wheel well in a truck bed. Such cutouts are difficult to make accurately and some surface of the truck bed is thereby exposed to the cargo.

A liner manufactured of wood also has drawbacks. A wood liner adds significant additional weight to the truck and reduces the carrying capacity of the truck. Materials and installation costs make wood liners relatively expensive. A number of different sizes and shapes would be necessary because of the differences between trucks made by different manufacturers or even differences in a particular model one year to the next. Further, wood absorbs spilled fluids. Subsequent cargos may then be contaminated or otherwise spoiled by the previously spilled fluids. Being made from a number of large panels and several boxshaped wheel well covers, the liner itself would occupy a large amount of storage space and would be difficult to install. These problems require that the wooden liner be installed and left on the truck. A wooden liner would not be satisfactory for an owner having a pickup truck for casual use and for only occasionally carrying cargo. The wooden liner protects the finish and surface of the bed, but also hides the surface from view.

Liners which are molded from a shock absorbant material would be lighter than the wooden panels discussed above but still decrease the cargo-carrying volume of the truck. As with the wooden liner, different shapes and sizes would be necessary for each different style of truck bed. Such lack of standardization increases the cost of the liner because the manufacturers and suppliers have to maintain a large inventory of parts for these different styles and sizes of truck beds. Further, the liner kit made from shock absorbant material is glued on the truck with adhesive. This results in a permanent installation on the truck bed and hides the bed surface from view.

A fabric liner also fails to overcome the disadvantages of the other liners. Cargo with sharp edges would easily cut through the fabric and cause the liner to tear. A torn liner does not protect the finish or walls of the bed. Nor does a fabric liner provide a cushioning effect to the cargo being carried by the pickup truck.

Thus, there exists a need in the art for an inexpensive, disposable liner for a pickup truck bed that is free of the problems typically associated with previously known bed liners.

SUMMARY OF THE INVENTION

The present invention provides an inexpensive, disposable liner for a pickup truck bed. Generally described, the present invention provides a liner of foldable material in a general cruxiform shape defined by a pair of side flaps, a front flap and a tailgate flap integral with a sheet to line the bottom of the truck bed. Each flap foldably connects to the sheet along a score line separating the flap and the sheet. The liner includes a pair of wheel well knockouts which are defined by perforated and scored lines in the sheet and the side flaps. Folding the side flap perpendicular to the sheet permits the wheel well knockout to pop out from the side flap and the sheet to form a rectangular cover over the wheel well of the truck bed.

A preferred embodiment of the present invention is formed from a blank of foldable material and includes at least one score line extending transverse to the longitudinal axis. The score line permits the liner to be folded to a size having a smaller area. This permits more convenient storage and handling of a single liner or a quantity of the liners. A tab extends from a flap and engages a slot in the sheet to retain the liner in the folded position.

The flaps fold upward perpendicular to the sheet to conform the liner to the shape of the pickup truck bed. Adjacent edges of the flaps define corners which may be joined together.

Accordingly, it is an object of the present invention to provide a liner for a pickup truck bed, which conforms to the shape of a pickup truck bed.

It is an object of the present invention to provide a liner for a pickup truck bed that is relatively inexpensive and disposable.

It is another object of the present invention to provide a liner for a pickup truck bed formed from a foldable, paperboard blank to line the bed and walls of the pickup truck.

It is yet another object of the present invention to provide a liner for a pickup truck bed that folds into a compact size and shape for handling and storage.

It is an object of the present invention to provide a liner for a pickup truck bed that resists moisture.

Still another object of the present invention is to provide a liner for a pickup truck bed which cushions the cargo items carried in the bed of the truck.

Still other objects, features, and advantages will become apparent upon a reading of the following detailed description in conjunction with the drawings and the appended claims.

BRIEF DESCRIPTION OF THE DRAWINGS

FIG. 1 is a plan view of a liner for a pickup truck bed according to the present invention having scores and perforations permitting the liner to conform to the bed of a pickup truck during installation and use.

FIG. 2 is a partial cutaway plan view of an alternate embodiment of the cardboard sheet illustrated in FIG. 1, having tabs and slots to lock together the side flaps, the front flap, and the tailgate flap.

FIG. 3 is a partial perspective view of an embodiment according to the present invention as illustrated in FIG. 1, having the flaps folded together to conform a liner to the pickup truck bed and to pop out the wheel well knockouts.

DETAILED DESCRIPTION OF THE PREFERRED EMBODIMENTS

Referring now in more detail to the drawings, in which like numerals indicate like parts throughout the several views, FIG. 1 illustrates in plan view a cruxiform-shaped liner 10 having scores and perforations to define foldable flaps and pop-out wheel well knockouts. The liner 10 conforms to the shape of the pickup truck bed in which the liner 10 is installed.

The liner 10 includes a truck bed sheet 12, a pair of side flaps 14, a front flap 16, and a tailgate flap 18. The flaps 14, 16, and 18 are integral to the bed sheet 12. The side flaps 14 each foldably connect to the liner 10 along a longitudinally extending score 20 in the surface of the liner 10. The front flap 16 foldably connects to the liner 10 along a score 22 transverse to the longitudinal axis of the sheet 10. Similarly, the tailgate flap 18 is defined by a score 24 extending transverse to the longitudinal axis of the sheet 10.

The liner 10 according to the present invention includes a pair of wheel well knockouts 26. A pair of spaced apart perforated scores 28a and 28b define the sides of the knockout 26. Each perforated score 28 extends laterally an approximately equal distance in the sheet 12 and in the adjacent side flap 14 transverse to the longitudinal score 20. A pair of longitudinal scores 30a and 30b connect the ends of the perforations 28a and 28b.

A pair of spaced apart score lines 34 and 36 create a fold line 32. The score lines 34 and 36 are closely spaced and in the illustrated embodiment each is transverse to the longitudinal axis of the sheet 10. In the illustrated embodiment, two sets of fold lines 32 and 32a are provided. These fold lines 32 and 32a divide the illustrated liner into three sections. A front section 33 extends from the fold line 32a towards and including the front flap 16. A back section 35 extends from the fold line 32 towards and including the tail gate flap. A middle section 37 is between the fold lines 32 and 32a.

A tab 39 is formed in the front panel 16. In the illustrated embodiment, the tab 39 is rectangular with three sides perforated and one side scored to enable the tab 39 to pivotally fold outwardly from the flap 39. A perforated slot 41 is cut in the sheet 12. The slot 41 has a width and length sized to receive the tab 39. A tab 43 similar to the rectangular tab 39 is formed in the tailgate flap 18. A perforated slot 45 sized to receive the tab 43 is cut in the sheet 12.

Turning now to FIG. 2 there is illustrated a partial cutaway plan view of an alternate embodiment of the liner 10. In this embodiment, the side flap 14 has an integral tab 38 extending from a front edge 40. The front flap 16 includes a slot 42 adjacent a side edge 44. The slot 42 has a width and length sufficient to receive the tab 38. The tailgate end of the side flap 14 also includes a tab 46 extending from a back edge 47. The tailgate flap 18 includes a slot 48 adjacent an edge 50. The slot 48 is sized to receive the tab 38.

FIG. 3 illustrates a partial cutaway perspective view of an embodiment of the liner 10 according to the present invention as it would be assembled for installation in the cargo bed of a pickup truck. The side flaps 14 and the front flap 16 fold upward perpendicular to the bed sheet 12 and crease along the respective scores 20 and 22. The rectangular wheel well knockouts 26 pop out from the flaps 14 and the sheet 12 to form an open ended rectangular cover over each wheel well (shown in phantom) of the pickup truck. The edge 40 of the flap 14 and the edge 44 of the front flap 16 form a corner 52. As illustrated in FIG. 3, the corner 52 is joined together with an adhesive film or tape 54.

FIG. 2 however illustrates an alternate embodiment which connects together the corners defined by the flaps 14, 16 and 18 with tabs and slots. The tab 38 of the flap 14 inserts into the slot 42 of the front flap 16 to join the flaps 14 and 16 together. In yet another alternate embodiment (not illustrated), the flap 16 does not include the flow 42. Rather, the tab 38 wraps over the outside of the corner 52 and folds against the exterior of the flap 16. The tab 38 is glued, stapled or otherwise fixed to the flap 16 to secure the corner 52.

Not illustrated in FIG. 3 are the corners defined by the tailgate flap 18 and the side flaps 14. Those corners however similarly connect together as do the corners illustrated in FIG. 3 with the tape 54, the tab 46 and slot 48, or the tab 46 wrapped over the corner and fixed to the flap 18.

The present invention accordingly provides a foldable disposable, inexpensive liner for rapid and easy installation in the bed of a pickup truck.

With reference to FIG. 1, the liner 10 is constructed from a blank of suitable foldable material such as fiberboard or paperboard. Corrugated cardboard is preferred, but stiff cardboard or foldable plastic material could be used. An embodiment using a waxed or coated paperboard blank for forming the liner resists absorption of moisture or spilled liquids. For instance, the embodiment illustrated in FIG. 2 also includes a wax coat 60. The blank is cut in the cruxiform shape with the scores embossed on one surface and the perforations cut through. The fold lines 32 and 32a are positioned to divide the illustrated liner 10 into approximate thirds when the liner 10 is folded or creased over the fold lines 32 and 32a. The front section 33 folds under the middle section 37 and the tailgate section 35 folds over on top of the middle section 37. The tab 39 inserts into the slot 41 to lock the bottom surface of the front section 33 adjacent the bottom surface of the middle section 37. The tab 43 inserts in the slot 45 to lock the folded tailgate section 35 adjacent the middle section 37. The liner 10 thereby is folded into a smaller, more manageable size for storage and handling. Another alternate embodiment includes a number of such fold lines 32 to provide an accordian-style folded liner 10 for compact storage and handling. The illustrated embodiment positions the two scorelines 34 and 36 closely adjacent to define the fold line 32. This permits the liner 10 to crease along the fold line 32 without stressing or tearing the liner material.

In an alternate embodiment, the score lines 30a and 30b would be perforated a short distance from the perforated lines 28a and 28b towards the midpoint of each scoreline 30. This permits a flap to be separated from the rectangular cover 26 and folded down to partially close the open ends of the rectangular cover 26 and thereby protect the longitudinal ends of the truck wheel well from scratching, denting or other damage.

Thus, it will be understood that a liner embodying the present invention provides a disposable, inexpensive liner for protecting the bed of a pickup truck and accomodates readily to the shape of the pickup truck bed including the wheel wells. The liner folds readily into a compact package for storage with a minimum of folds and presents a large area for printing of messages or advertising. The dimensions of the liner of the present invention may be selected to allow the liner to be folded for storing behind the seat of a pickup truck. The dimensions may be selected to provide a liner for a general class of pickup truck or custom fit for a particular model. For instance, the wheel well knockouts 26 may be sized and positioned longitudinally along the score line 20 an appropriate distance from the tailgate flap 18 for a specific truck or for a general class of trucks.

The principles, preferred embodiments and modes of operation of the present invention have been described in the foregoing specification. The invention is not to be construed as limited to the particular forms disclosed, because these are regarded as illustrious rather than restrictive. Moreover, variations and changes may be made by those skilled in the art without departing from the spirit of the invention as set forth by the following claims.

What is claimed is:

1. A liner for a pickup truck bed, comprising:
    a paperboard sheet having in plan view a rectangular shape defined by two longitudinal sides and two transverse sides;
    at least one integral side flap extending from each longitudinal side of the sheet along a side score line parallel to a longitudinal axis of the sheet;
    at least one integral front flap extending from one of the transverse sides of the sheet along a front score line transverse to the longitudinal axis of the sheet;
    at least one integral tailgate flap extending from the other transverse side of the sheet along a back score line transverse to the longitudinal axis of the sheet; and
    a pair of wheel well knockouts, each defined by a pair of spaced-apart parallel perforated lines which extend from the respective side score line into the side flap and the sheet, whereby breaking the perforated lines and folding the respective side flap perpendicular to the sheet permits the wheel well knockout to extend perpendicular from the side flap and the sheet to form an open ended rectangular cover.

2. The liner for a pickup truck bed as recited in claim 1, further comprising at least one scoreline whereby the sheet may be folded to have a smaller plan view surface area.

3. The liner for a pickup truck bed as recited in claim 2, further comprising means for securing the sheet in a folded position.

4. The liner for a pickup truck bed as recited in claim 3, wherein the means for securing comprises:
    a tab extending from the sheet;
    a slot in the sheet,
    whereby folding the sheet along the crease line to reduce the plan view area of the sheet, permits the tab to engage the slot to hold the sheet in a folded position.

5. The liner for a pickup truck bed as recited in claim 1, further comprising means for connecting together a plurality of corners defined by folding the side flaps, the front flaps and the tailgate flap along their respective score lines to conform the liner to the shape of the pickup truck bed.

6. The liner for a pickup truck bed as recited in claim 5, wherein the means for connecting is an adhesive film.

7. The liner for a pickup truck bed as recited in claim 5, wherein the means for connecting comprises as least one tab which engages a slot 8. The liner for a pickup truck bed as recited in claim 5, wherein the means for connecting comprises:
    a tab extending from the side flap, which wraps over the corner, and means for attaching the tab to an adjacent flap.

9. The liner for a pickup truck bed as recited in claim 1, further comprising a fold line transverse to the longitudinal axis whereby a first section of the sheet may be folded over a second section of the sheet such that a sheet surface in the first section is adjacent a sheet surface in the second section.

10. The liner for a pickup truck bed as recited in claim 9, further comprising:
    a tab in the first section; and
    a slot in the second section, whereby the tab engages the slot to retain the liner in a folded position.

11. A liner for a pickup truck bed, comprising:
a sheet of corrugated cardboard having a pair of side flaps, a front flap and a tailgate flap, each flap integral to the cardboard sheet and defined by a score;
a pair of wheel well knockouts, each knockout defined by a pair of spaced apart parallel perforations which extend laterally on the sheet and the side flap an equal distance transverse to the score defining the side flap,
whereby folding the side flap perpendicular to the sheet permits the wheel well knockout to extend perpendicular to the side flap and the sheet to form an open-ended rectangular cover.

12. The liner as recited in claim 11, further comprising two spaced apart pairs of spaced apart scores transverse to the longitudinal axis of the liner,
whereby a first and a second section of the sheet may be folded over a middle section of the sheet to bring a sheet surface in each of the first and second sections adjacent a sheet surface in the middle section.

13. The liner as recited in claim 11, further comprising as least one creaseline whereby the sheet may be folded to have a smaller surface area.

14. The liner as recited in claim 13, further comprising:
a tab extending from the sheet;
a slot in the sheet to receive the tab,
whereby folding the sheet along the creaseline permits the tab to engage the slot to hold the sheet in the folded position.

15. The liner as recited in claim 11, wherein the sheet is coated to resist absorption of moisture.

16. The liner as recited in claim 11, further comprising means for connecting a front edge of one side flap with a side edge of the front flap and for connecting a back edge of the same side flap with a side edge of the tailgate flap.

17. The liner as recited in claim 16, wherein the means for connecting is an adhesive backed film.

18. The liner as recited in claim 17, wherein the means for connecting comprises:
a tab extending from each of the front edge and the back edge of the side flap;
a slot adjacent each side edge of the front flap and the tailgate flap,
whereby the tab engages the slot when the side flaps, the front flap, and the tailgate flap fold along their respective scores to conform the sheet to the pickup truck bed.

19. The liner as recited in claim 11, wherein the sheet further comprises means for resisting absorption of moisture.

20. The liner as recited in claim 19, wherein the means for resisting is a wax coating applied to the sheet.

21. A liner for a pickup truck bed, comprising:
a foldable blank in a generally cruciform shape defined by a pair of side flaps, a front flap and a tailgate flap integral with a substantially rectangular sheet, each flap foldably connected to the sheet along a score line; and
a pair of wheel well knockouts, each defined by a pair of perforated lines which extend from the respective side score lines into the side flap and the sheet and by a pair of wheel well knockout score lines, one said score line connecting the ends of the perforated lines in the side flap and the other said score line connecting the ends of the perforated lines in the sheet, whereby breaking the perforated lines and folding the respective side flap perpendicular to the sheet permits the wheel well knockout to extend perpendicular from the side flap and the sheet to form an open ended rectangular cover.

22. The combination of a pickup truck bed and liner, wherein the liner comprises:
a sheet of corrugated cardboard having a pair of side flaps, a front flap and a tailgate flap, each flap integral to the cardboard sheet and defined by a score;
a pair of wheel well knockouts, each knockout defined by a pair of spaced apart parallel perforations which extend laterally on the sheet and the side flap an equal distance transverse to the score defining the side flap,
whereby folding the side flap perpendicular to the sheet permits the wheel well knockout to extend perpendicular to the side flap and the sheet to form an open-ended rectangular cover.

23. The combination as recited in claim 22, further comprising a pair of wheel wells in the pickup truck bed.

* * * * *